United States Patent
Field

[15] 3,707,051
[45] Dec. 26, 1972

[54] RACING RULES CORRELATOR
[72] Inventor: Greg A. Field, Annapolis, Md.
[73] Assignee: S and R Associates, Inc., Annapolis, Md.
[22] Filed: Feb. 22, 1971
[21] Appl. No.: 117,611

[52] U.S. Cl.............................................40/70, 35/74
[51] Int. Cl.........................G09f 11/04, G09b 23/00
[58] Field of Search..........40/70, 113, 34; 35/74, 28, 35/11

[56] References Cited

UNITED STATES PATENTS

| 3,249,085 | 5/1966 | St. Jean | 40/70 R |
| 283,408 | 8/1883 | MacDonell | 40/34 X |
| 3,579,875 | 5/1971 | Dubost | 35/48 R |
| 3,570,140 | 3/1971 | Sprong | 35/11 |

FOREIGN PATENTS OR APPLICATIONS

| 1,401,227 | 4/1965 | France | 35/74 |
| 1,276,681 | 10/1961 | France | 40/113 |
| 938,689 | 10/1963 | Great Britain | 35/28 |

Primary Examiner—Robert W. Michell
Assistant Examiner—J. H. Wolff
Attorney—Sughrue, Rothwell, Mion, Zinn & Macpeak

[57] ABSTRACT

A pair of rotatable overlapping discs carrying data relative to two racing yachts are rotated relative to each other to a position indicative of the relative situation between the yachts to expose the appropriate racing rule governing their subsequent behavior.

8 Claims, 3 Drawing Figures

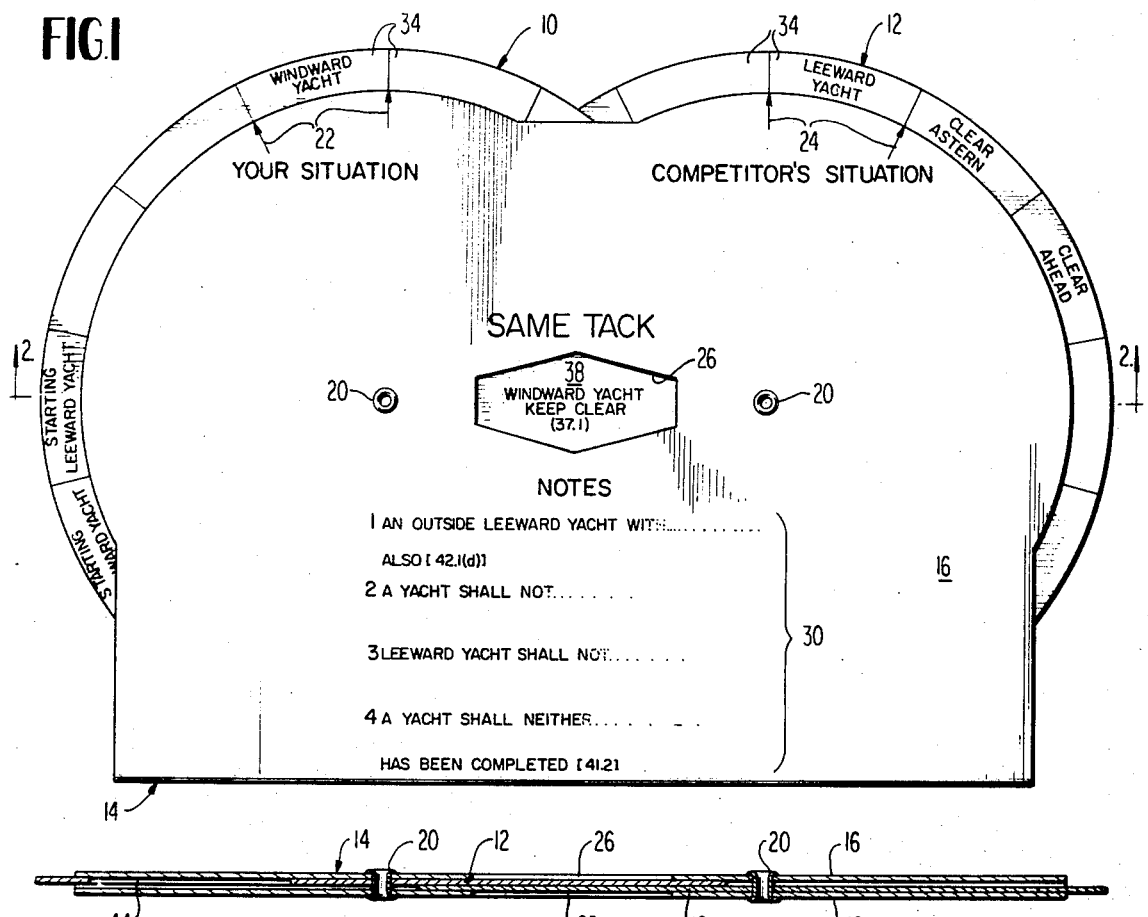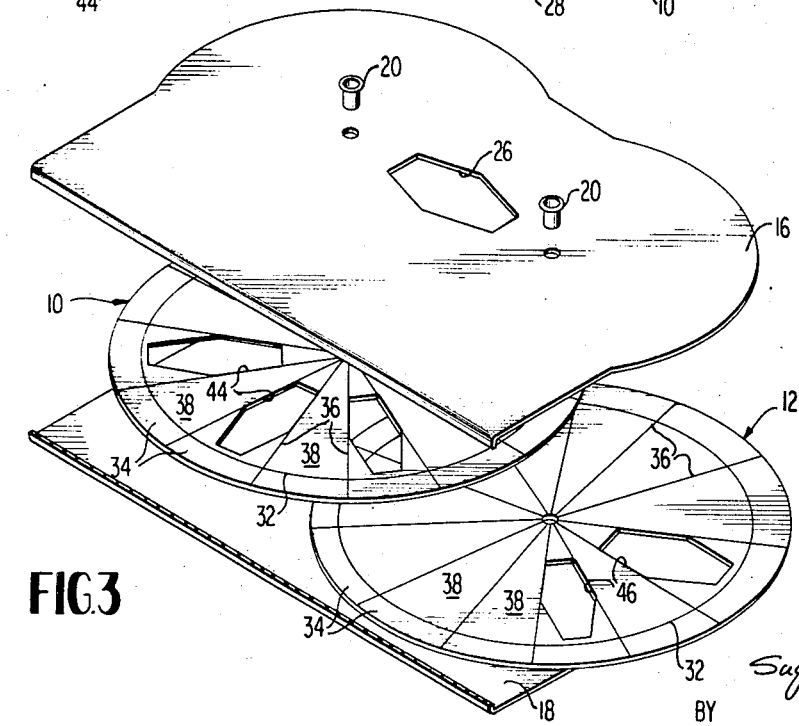

3,707,051

RACING RULES CORRELATOR

BACKGROUND OF THE INVENTION

1. Field of the Invention

The present invention relates generally to a data correlating device for nautical information and, more particularly, to a multiple disc-type indicator for readily displaying in a selective manner, the racing rules which yachts participating in sailing races are required to observe corresponding to the position of their yachts.

2. Description of the Prior Art

In the past, racing rule books have been employed to familiarize yacht racing participants, students or prospective race participants with the rules governing the operation of yachts before, during and after the race. However, these books, while helpful, do not provide a quick ready reference, since the individual must examine a multiplicity of separate rules normally found on separate pages and identify the correct one covering the particular situation at hand.

SUMMARY OF THE INVENTION

The present invention is directed to a disc-type indicator or training device formed of light-weight water proof construction and of compact design that can readily be set to indicate the relative position of two racing yachts as, for example, the situation where one yacht is on the starboard tack and the other is on the port tack and, due to the relative situation, provides immediately for the display of the rule governing the situation. Thus, with the indicator of the present invention, the user, and in all probability the operator of a given yacht, can readily scan the correct rule and its number that governs the particular situation between the user's yacht and a competitor's yacht and take the appropriate action proscribed by the rule.

In the illustrated embodiment, the present invention consists of a simple and rugged construction and in one series of settings depicts the apparent relative situation between two racing yachts and additionally gives in short form the particular rule applicable to the existing situation.

More particularly, the invention employs two flat circular discs made of metal, wood, plastic, cardboard or other suitable rigid sheet material. The discs have preselected nautical data recorded on both faces thereof. On one face, the data relates to yachts sailing on the same tack, and on the other, for both discs, data relating to yachts sailing on opposite tacks and miscellaneous racing situations. The two discs are mounted in a frame of like material defined by spaced panels housing the discs with the discs mounted for rotation within the frame: the axis of rotation for one disc being laterally offset with respect to the other allowing the discs to rotate within the frame in overlapped position. With the two discs mounted in overlapping fashion, the frame covering the same is provided with a viewing window cut in each side and preferably aligned with the frame are further provided selector marks on the periphery of upper edge portions which are curved and which correspond in general to the periphery of the discs carried thereby. The diameter of the disc is such that a peripheral marginal portion of each disc extends beyond respective curved portions of the frame panel. In the preferred embodiment, nautical data relating to the various situations of each yacht allows the disc to be rotated so that the particular yacht situation is set at or between the frame marks. Preferably, the various yacht situation data is carried by first disc sector portions, in this case on the uncovered margin of both discs, allowing initial setup of one disc for the operator and another for that of the competing yacht. Upon setting of both discs, the operator readily reads through one of the windows a specific rule governing the instant situation between the yachts.

In this respect, the rules are carried within second sector portions, which may be radially inwards of the sector portions carrying the individual yacht situation data on the marginal areas of the disc periphery. Both discs also carry a number of windows corresponding in position and size to that of the windows within the frame panel, allowing when viewed from one side of the frame or the other, information either on the overlying disc or the underlying disc, depending upon whether the overlying disc presents its own window or a particular rule at that specific rotated position to the frame window. In all cases, the operator reads through the frame window, the specific rule governing the situation between the respective yachts. Additional pertinent information is carried on the outer surface of the disc panel to be read under directions of the uncovered rule on the individual disc.

Thus, by selecting the appropriate side of the correlator, the operator can in a minimum time period take adequate stock of the racing situation and plan an appropriate course of action with the specific rule as his guide.

It is, accordingly, a primary object of the present invention to provide a data correlating device for use in nautical applications and, in particular, to applications involving situations between two sailing yachts under racing conditions.

Another object of the present invention is to provide a data correlating device which can be used as a quick reference to indicate the various rules governing racing yachts either during racing or for purposes of studying the racing rules. Thus, as a further object of the present invention, it is desired to provide a training aid for instructing individuals in the rules governing racing yachts.

Other objects, advantages and novel features of the invention will become apparent from the following detailed description of the invention when considered in conjunction with the accompanying drawings.

BRIEF DESCRIPTION OF THE DRAWINGS

FIG. 1 is a face view of the assembled data correlating device of the present invention taken of the same tack side of the device.

FIG. 2 is a section of the device of FIG. 1 taken along a plane containing the axes of both discs.

FIG. 3 is an exploded view of the device of FIGS. 1 and 2.

DESCRIPTION OF THE PREFERRED EMBODIMENT

Referring to the drawings, it will be seen that the present invention in one preferred embodiment takes the form of two overlapping circular discs 10 and 12 secured within a stationary frame indicated generally at 14 and comprising spaced upper and lower panels 16 and 18, the assembly being completed by rivets 20 or similar fastening, allowing the discs to be rotated about the axis defined by respective rivets in overlapping fashion within the stationary frame 14. The frame may be considered as the base element of the indicator with its upper periphery, when held in the hand as indicated at FIG. 1 facing the viewer, provided with two selector marks 22 on the left side and two selector marks 24 on the right side. The stationary frame is provided, within respective panels 16 and 18, truncated double diamond windows 26 and 28 respectively. Pertinent explanatory information is printed at 30 on both sides of the stationary framework relating to yacht situations in turn, printed on the outer or first sectors or sector portions 34 of discs 10 and 12. Each disc is divided into inner and outer rings by circle 32 with the rings, in turn, being separated by radial lines 36 to define second sectors or sector portions 38. The outer sector portions 34 have typical relative yacht situations printed therein within each first sector portion on both sides of disc 10 and 12, as for instance, "windward yacht," "leeward yacht," "clear astern," "clear ahead" and so on. In turn, the inner ring, divided into second equal sector portions 38 identical in number to those of the outer ring, in this case totalling the number fourteen. The information printed within the second sectors or second sector portions corresponds to the racing rules which govern the relative yacht situations printed in the first sector portions of the outer ring. Certain of the inner ring sector portions have windows or cutouts similar to those within the frame panel these windows being identified for respective discs 10 and 12 as at 44 and 46, respectively. The windows allow information or data in terms of rules to be read through the axially aligned windows of both frame panel and that of the immediately underlying disc at times, permitting viewing of the data regarding a racing rule as carried by the underlapped disc.

Each of the two rotating discs 10 and 12 is of similar construction and appearance except for the nature of the data printed thereon relating to a particular rule and the number and location of the second sector portions within the inner ring which have been cut out. For example, one side of the disc 10 and 12 carries rule information and yacht situation information or data pertinent to yachts sailing on "the same tack" while the reverse sides of the discs carry data and yacht situation and rule data or information pertaining to yachts on "opposite tacks" and to "miscellaneous" racing rules. Additional information 30 is always visible on the panels and further pertains to respective same tack or opposite tack situations.

The rotating discs 10 and 12 have essentially two rings of data printed thereon which, in turn, are due to the radial lines — separated into first and second, that is, outer and inner sectors or sector portions. Due to the position of the windows within the opaque, rigid panels of the frame 14, the information within the inner or second sectors is circumferentially offset in the illustrated embodiment from the corresponding situation information carried by the first or outer sector rather than being radially aligned.

The operation of the device of the present invention is relatively simple. To use the device, the operator needs only to ascertain whether the current situation applies to "same tack" or "opposite tack" and "miscellaneous" yacht situations. The operator turns the device to that side and then aligns an outer sector 34 of the operator's own relative yacht situation as given by the left hand disc 10, for instance, within marks 22. When that is achieved, the operator will see if the window 26 on the same side of the panel reveals a printed rule which corresponds to the solution to the situation as indicated by his own disc. If so, the correct rule covering the situation will be given. If not, the operator will have to align his competitor's relative yacht situation disc 12 with selector marks or indicators 24 — at which point the correct racing rule within sector 38 for the given situation will automatically appear within the same window 26. In this case, rotating the second disc 12 to a position wherein one of its first sectors 34 is between marks 24 causes the rule to automatically appear within both the window 26 of the frame panel and an underlying window 44 of the first disc 10 corresponding to the operator's yacht.

As an illustrative example, as assumption is made that the operator's selector disc is set at "windward yacht" and reference to window 26 within the same tack panel fails to disclose an applicable rule carried by operator's disc 10. In fact, disc 10 presents its own window 44 which underlies and is aligned with the window 26 of the frame panel 16. Under such circumstances, viewing the window in the frame does not display an applicable rule until the operator sets up his competitor's situation by rotating the competitor's disc 12. For instance, assuming the situation is such that the competitor's yacht is "leeward yacht" rotation of the disc so that the situation-sector 34 appears between the competitor's situation markers 24 — the aligned windows of panel 16 and the operator's situation disc 10 reveals the rule which reads "windward yacht keep clear (37.1)." The operator now knows how the situation is covered by the racing rules, but, under some circumstances, to obtain further information, the operator must read the notes printed immediately below the window 26 on panel 16 or 18. On same tack side of the device, note 3 reads in this case "Leeward yacht shall not luff above a close hauled course unless the helmsman of the windward yacht is abaft the mainmast of the leeward yacht." It should be noted, however, that not all inner ring sectors of both discs 10 and 12 are appended with notes requiring reference to those further notes on the stationary frame.

In all forms of the invention, there is provided a lightweight relatively inexpensive convenient racing rules correlating and selecting device for use whenever problems arise concerning yacht racing rules and related areas, such as sailing, educational programs and race protests. The device may be imprinted with advertising data in use for advertising purposes by dealers and owners in the marine trade. It may also be used by students and teachers as technical devices and by salesmen as promotional devices. The device is also readily imprinted with forms in which racing data relative to a particular race may be inserted as to either the right or the left of the notes appearing beneath the window.

While the preferred embodiment of the present invention has been illustrated and described, it is to be understood that the invention is not limited to the precise constructions herein disclosed and that various changes and modifications may be made within the scope of the invention as defined in the appended claims.

What is claimed is:

1. A data correlating device for teaching personnel the rules governing yacht racing between two yachts sailing on the same or different tacks, said device comprising, in combination:

a stationary frame, a pair of rotatable, overlapping discs carried by said frame for rotation about respective, separate, spaced axes, each disc corresponding respectively to a given yacht and carrying at circumferentially and radially spaced positions sets of situation data relative to said two yachts on the same or different tacks and further carrying radially inwards of said situation data circumferentially spaced sets of rule data governing behavior of both yachts, and means including said frame in juxtaposition to both discs for exposing by relative rotation of said discs situation data on each disc relative to the position of each yacht regardless of its tack, and the corresponding rule on one of said discs covering the particular situation at hand and governing the prescribed conduct of both yachts.

2. The data correlating device as claimed in claim 1, wherein said frame constitutes an opaque panel and includes a window overlying the overlapped disc portions for viewing the rule data pertaining to the racing yacht situation and wherein the overlying rotatable disc immediately facing said frame panel includes corresponding windows at selected circumferentially spaced positions to allow the user to view rule data carried by the underlying disc under particular situations.

3. The data correlating device as claimed in claim 1, wherein: said frame comprises a pair of spaced panels, said rotatable discs are mounted between said panels in overlapping, aligned position, windows are provided within each panel to permit viewing rule data on respective discs, said panels correspond respectively to the same and different tacks of said two yachts, said discs are provided on each side with exposed marginal rim portions subdivided into a plurality of first arcuate sectors carrying at circumferentially spaced locations said sets of situation data, and said discs include a second series of arcuate sectors carrying, respectively, said racing rules radially inwards of said first sectors for selective movement to positions within said windows.

4. The data correlating device as claimed in claim 3, wherein both discs are provided with similarly shaped windows of identical size and being similarly shaped and sized to said windows of said spaced panels and at selected circumferential positions corresponding to said second series of arcuate sectors and to thereby permit selective viewing of the rule data carried by both overlapped discs from either side of said device.

5. A data correlating device for familiarizing personnel with rules governing yacht racing between two yachts sailing on the same or different tacks comprising, in combination:

a stationary frame including two flat walls overlying each other, each wall representing a respective tack situation between said two yachts, two flat discs, each corresponding respectively to a given yacht mounted for rotation about respective, separate, spaced axes in overlapping fashion within said walls, each disc having an exposed rim portion on each side subdivided into a plurality of arcuate outer sectors having printed thereon descriptive phrases for one of said two yachts, identifying relative situations of said two yachts, each of said discs being further subdivided correspondingly into a number of radial inner sectors, said discs being overlapped to the extent of said inner sectors, each of said discs further having identically sized, configured and positioned windows strategically cut therefrom within said inner sectors at selected locations, selected inner sectors of both discs on both sides further having racing rules printed thereon and related to the relative yacht situation information printed in respective outer sectors radially spaced therefrom, each wall of said stationary frame being further provided with a window of a size, configuration and position corresponding to the windows within said inner sectors of the overlapped portions of said discs, whereby, in response to relative rotation of said discs for both yachts, the rule governing a particular yacht situation at hand, regardless of the relative tack situation between said yachts, may be viewed within one of said two wall windows as it appears on one of said two discs within a given inner sector thereof.

6. The device as claimed in claim 5, further comprising a pair of selector marks carried by said frame adjacent the rim portion of said rotatable discs on each side of the stationary frame with said selector marks being circumferentially spaced a distance equal to the arcuate length of each rim sector.

7. The device as claimed in claim 6, wherein a truncated double diamond window is cut from each side of the stationary frame and cooperates with similar windows formed within said overlapped rotating disc to expose to the view of the user all of the rule data during rotation of said disc through a complete cycle and said stationary frame further includes additional pertinent data printed thereon relating to either the yacht situation or rule data printed in the inner or outer sectors of said two discs.

8. The device as defined in claim 6, wherein said rotating discs each represent different relative yacht racing situations, said rotating disc mounted to the left of center of said stationary frame represents the user's relative yacht situation, said rotating disc mounted to the right of center of said stationary frame represents the relative yacht situation of the user's competitor, the marginal sectors of said left disc being selectively color coded to indicate under certain situations relative to the user's yacht situation, that the rule governing his situation may be read immediately within the truncated double diamond window without the necessity of movement of the right hand competitor disc and selected sector positions having no color coded arcuate marginal sectors, to inform the user that he must set up his competitor's relative yacht situation via the right disc, whereby: the correct rule governing the two competitors is then automatically presented to the user for viewing through the truncated window.

* * * * *